United States Patent Office 3,002,586
Patented Oct. 3, 1961

3,002,586
INHIBITING THERMAL DEGRADATION OF PHOSPHORYL TRI-DIMETHYL AMIDE
Warren J. Rabourn, Jr., Lake Jackson, Tex., assignor to The Dow Chemical Company, Midland, Mich., a corporation of Delaware
No Drawing. Filed Feb. 19, 1960, Ser. No. 9,710
9 Claims. (Cl. 183—115)

This invention relates to a method for substantially inhibiting the thermal degradation of phosphoryl tri-(dimethyl amide) and to a process for removing acetylene from acetylene-containing gas streams, said process employing phosphoryl tri-(dimethyl amide) as an absorbent for acetylene.

It has been observed that phosphoryl tri-(dimethyl amide), when heated to and maintained at a temperature of from about 110° to about 200° C. for several days, undergoes substantial degradation, resulting in the formation of polymeric degradation products and a darkening or blackening of the amide. Such degradation necessitates purification and partial replacement of the amide.

It has now been discovered that the thermal degradation of the amide is substantially inhibited, particularly at from about 110° C. to about 200° C., when there is added to the amide an amount, sufficient to substantially inhibit the degradation of the amide, of a basic oxide or a hydroxide or a basic salt of an alkali or alkaline earth metal or of aluminum or an aqueous solution of such basic oxide, hydroxide, or basic salt. The amount of inhibiting material required will depend on the particular inhibitor used and on the particle size of that material, i.e., a lesser amount of material in powder or other highly dispersed form, furnishing a large total surface area, will be required than if the same material is added in the form of flakes, pellets, lumps, or the like. It has been found that two pounds of solid sodium hydroxide flake per 100 gallons of amide, for example, reduced the amount of degradation products by 60 to 70 percent.

The use of the class of materials hereinbefore described for substantially inhibiting the thermal degradation of phosphoryl tri-(dimethyl amide) comprises then one aspect of the present invention.

It is known in the art that phosphoryl tri-(dimethyl amide) is an excellent solvent for acetylene. The high solvent power of this amide for acetylene is utilized in separating acetylene from other gaseous components having little or no solubility in the amide (see U.S. Patent 2,623,611, by Levine and Isham). This separation process typically comprises an absorption tower or chamber wherein the acetylene-containing gas stream is contacted counter-currently at from about 10° C. to about 40° C., with the phosphoryl tri-(dimethyl amide) (hereinafter referred to as "the amide"). The acetylene and other components of the gas stream are absorbed in the amide to the extent permitted by the process conditions. The non-absorbed gases are separated from the amide, such as by passing the non-absorbed gases out the top of the absorption column. The amide solution of acetylene and other absorbed gases is then pumped to one or more stripping columns where acetylene and any other gases, which are desirably recovered, are removed from the amide. The amide may then be recycled directly to the original absorption column, or may be pumped to storage for subsequent recycle.

It has been found, however, that under the conditions normally employed in the acetylene separation process, the amide undergoes substantial thermal degradation, resulting in the accumulation of large amounts of products formed by the decomposition of the amide. These products exist largely as residues suspended in the amide solution and carried through the system by said solution, resulting in deposition of, and plugging by, these residues in various locations throughout the system.

It has been discovered, however, that the deficiencies of the known process hereinbefore described are largely overcome by incorporating into the acetylene absorption system an amount, sufficient to substantially inhibit the thermal degradation of the amide, of a compound selected from the group consisting of basic oxides and hydroxides and basic salts of alkali and alkaline earth metals and aluminum and aqueous solutions thereof.

The inhibitor is located in the system between the acetylene stripping column and the storage tank from where the amide is pumped to the absorber. Preferably the inhibitor is situated in a fixed bed and the amide allowed to pass through the inhibitor bed at a predetermined rate, affording sufficient contact to substantially inhibit the amide from thermal degradation.

Another aspect of the present invention comprises the placing of a second bed of inhibitor into the system, downstream from the absorption column and prior to the acetylene stripping column.

The acetylene-containing gas stream normally contains one or more gases other than acetylene which are desirably separated from the acetylene in the process. These gases may be reclaimed or vented to the atmosphere. Gases commonly found admixed with acetylene in feed streams include methane, ethane, hydrogen, ethylene, and carbon dioxide.

The present invention relates to the use of the inhibitor in an absorption system wherein acetylene is separated from any gases which are not significantly absorbed in the amide, and from any gases which are absorbed, and then removed from the amide at from about 110°–150° C. A particular embodiment of the present invention comprises the separation of acetylene from a gas stream containing acetylene and carbon dioxide, wherein the carbon dioxide is removed from the acetylene-containing amide at from about 60° C. to about 80° C.

The practice of the present invention is illustrated by the following examples.

EXAMPLE I

A quantity of pure phosphoryl tri-(dimethyl amide) was heated in a closed container at 152° C. under a nitrogen atmosphere for seven days. The average daily decomposition of the amide, determined by titrating the volatile amine released, was 0.372 percent. By the end of the seven-day period, the amide had degraded to a black opaque liquid.

EXAMPLES II–VI

In each of a series of experiments, one gram-mole of phosphoryl tri-(dimethyl amide) was heated for five days at 157° C. with a basic oxide or hydroxide or a basic salt and the average percent decomposition was determined as in Example I. In each experiment the amide was clear and colorless at the end of the heating period. There are shown in Table I the particular compound that was heated with the amide, the ratio of the weight of the compound employed to the weight of the amide, and the average percent decomposition per day of the amide.

Table I

| Example No. | Compound | Moles Compound/ Mole Amide | Percent Decomposition Per Day |
|---|---|---|---|
| 2 | Anhydrous sodium hydroxide | 1.0 | 0.014 |
| 3 | Aqueous sodium hydroxide solution. | 0.1 | 0.018 |
| 4 | Solid sodium orthosilicate | 0.5 | 0.047 |
| 5 | Aluminum oxide | 0.39 | 0.094 |
| 6 | Magnesium oxide | 0.25 | 0.017 |

It is thus seen that the use of any of the compounds listed above greatly inhibits the decomposition of the phosphoryl tri-(dimethyl amide).

EXAMPLE III

Two hundred pounds of sodium hydroxide flake were added to an acetylene absorption system containing 10,000 gallons of phosphoryl tri-(dimethyl amide) which was circulated through the system at the rate of about 150 gallons per minute. The sodium hydroxide was located in a fixed bed downstream from the acetylene stripping column and ahead of the amide storage tank. The temperature of the amide at the point of contact with the sodium hydroxide was 115°–125° C.

Three times per week after the addition of the sodium hydroxide, any remaining sodium hydroxide was removed in addition to polymeric degradation products of the amide, and two hundred pounds of fresh sodium hydroxide flake were added.

Prior to the addition of sodium hydroxide to the system, degradation products accumulated at the rate of 1500 pounds per week and the loss of the phosphoryl tri-(dimethyl amide) averaged 500 pounds per day. Subsequent to the introduction of sodium hydroxide into the system, the degradation products accumulated at the rate of 500 pounds per week and the loss of the amide averaged 220 pounds per day.

In addition to the compounds disclosed in the examples as inhibitors, other compounds within the scope of the method of the present invention may be employed, such as, for example, sodium oxide, potassium oxide, potassium hydroxide, calcium oxide, barium hydroxide, strontium hydroxide, sodium acetate, sodium phosphate, sodium carbonate, sodium citrate, sodium oxalate, tetrasodium versenate, potassium acetate, potassium carbonate, potassium arsenate, potassium silicate, calcium acetate, calcium carbonate, calcium phosphate, calcium silicate, calcium sulfide, barium acetate, barium carbonate, barium citrate, barium oxide, barium silicate, barium sulfide, strontium acetate, strontium carbonate, strontium formate, strontium oxalate, strontium oxide, strontium silicate, magnesium acetate, magnesium carbonate, magnesium citrate, magnesium formate, magnesium hydroxide, magnesium oxalate, magnesium phosphate, magnesium silicate, magnesium sulfide, aluminum acetate, aluminum citrate, aluminum hydroxide, aluminum phosphate, aluminum potassium silicate, aluminum potassium tartrate, aluminum silicate, and the like.

It is also to be understood that aqueous solutions of the compounds disclosed in the method of the present invention may be employed in lieu of the solid materials. The aqueous solution can be inserted into the acetylene absorption system in a fixed tank or vessel and contacted with the amide so as to inhibit the thermal degradation of the amide.

I claim:

1. A method for substantially inhibiting the thermal degradation of phosphoryl tri-(dimethyl amide) comprising contacting said amide with an amount, sufficient to substantially inhibit said thermal degradation, of a member selected from the group consisting of basic oxides and hydroxides and basic salts of alkali and alkaline earth metals and aluminum and aqueous solutions thereof.

2. A method as in claim 1 wherein the phosphoryl tri-(dimethyl amide) is contacted at a temperature of from about 110° C. to about 200° C.

3. A method as in claim 1 wherein the contacted member is solid sodium hydroxide.

4. A process for removing acetylene from acetylene-containing gas streams comprising contacting, at between about 10° C. and about 40° C., said gas stream with a quantity, sufficient to absorb at least a significant part of the acetylene, of phosphoryl tri-(dimethyl amide), separating the non-absorbed gases from the amide, separating the absorbed gases from said amide; contacting said amide with an amount, sufficient to prevent substantial thermal degradation of the amide in the process, of a member selected from the group consisting of basic oxides and hydroxides and basic salts of alkali and alkaline earth metals and aluminum and aqueous solutions thereof; and then recycling the amide to the process.

5. A process as in claim 4 wherein the amide is contacted with solid sodium hydroxide.

6. A process for removing acetylene from gas streams containing acetylene and carbon dioxide, comprising, contacting, at between about 10° C. and 40° C., said gas stream with a quantity, sufficient to absorb at least a major portion of the acetylene and at least a part of the carbon dioxide, of phosphoryl tri-(dimethyl amide); separating the amide from any undissolved gases, removing substantially all of the carbon dioxide from the amide by heating the latter at about 60° C. to 80° C., then removing the acetylene from said absorbent by heating it at from about 110° C. to 150° C.; contacting said absorbent with an amount, sufficient to prevent substantial thermal degradation in the process of the absorbent, of a member selected from the group consisting of basic oxides and hydroxides and basic salts of alkali and alkaline earth metals and aluminum and aqueous solutions thereof; and recycling the absorbent to the process.

7. A process as in claim 6 wherein the amide is contacted with solid sodium hydroxide.

8. A process for removing acetylene from gas streams containing acetylene and carbon dioxide, comprising, contacting at between about 10° C. and 40° C., said gas stream with a quantity, sufficient to absorb at least a major portion of the acetylene and at least a part of the carbon dioxide, of phosphoryl tri-(dimethyl amide); separating the amide from any undissolved gases; contacting said amide with an amount, sufficient to prevent substantial thermal degradation of the amide, of a member selected from the group consisting of basic oxides and hydroxides and basic salts of alkali and alkaline earth metals and aluminum and aqueous solutions thereof; removing substantially all of the carbon dioxide from the amide by heating the latter at about 60° C. to 80° C., then removing the acetylene from said amide by heating it at from about 110° C. to 150° C.; contacting said amide with an amount, sufficient to prevent substantial thermal degradation in the process of the amide, of a member selected from the group previously described; and recycling the amide to the process.

9. A process as in claim 8 wherein the amide is contacted with solid sodium hydroxide.

References Cited in the file of this patent

UNITED STATES PATENTS 2,623,611    Levine et al. _____ Dec. 30, 1952